(12) United States Patent
Takizawa

(10) Patent No.: US 9,166,258 B2
(45) Date of Patent: Oct. 20, 2015

(54) COOLING APPARATUS FOR VEHICLE-MOUNTABLE BATTERY PACKS

(71) Applicant: SUZUKI MOTOR CORPORATION, Shizuoka (JP)

(72) Inventor: Koji Takizawa, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 13/958,862

(22) Filed: Aug. 5, 2013

(65) Prior Publication Data

US 2014/0057150 A1     Feb. 27, 2014

(30) Foreign Application Priority Data

Aug. 23, 2012   (JP) .................. 2012-184244

(51) Int. Cl.
*H01M 10/625* (2014.01)
*B60L 11/18* (2006.01)
*H01M 10/663* (2014.01)
*H01M 10/6563* (2014.01)
*B60H 1/00* (2006.01)

(52) U.S. Cl.
CPC ....... *H01M 10/5016* (2013.01); *B60L 11/1874* (2013.01); *H01M 10/625* (2015.04); *H01M 10/6563* (2015.04); *H01M 10/663* (2015.04); *B60H 2001/003* (2013.01); *Y02T 10/705* (2013.01); *Y02T 10/7005* (2013.01)

(58) Field of Classification Search
CPC .......... H01M 10/5016; H01M 10/625; H01M 10/663; H01M 10/6563
See application file for complete search history.

(56) References Cited

FOREIGN PATENT DOCUMENTS

JP       2006-73256 A       3/2006

OTHER PUBLICATIONS

The First Office Action mailed Aug. 6, 2015 in corresponding Chinese Patent Application No. 201310346736.X (with an English translation) (11 pages).

*Primary Examiner* — Helen O Conley
(74) *Attorney, Agent, or Firm* — Rothwell, Figg, Ernst & Manbeck, P.C.

(57) ABSTRACT

A battery pack 10 has a built-in cooling fan to suction outside air through an air cleaner 16 and an air suction port. The battery pack 10 has a combination of the air suction port and a service plug 25 and a combination of the air cleaner 16 and a 12V terminal set 23 arranged at an upside. The air suction port and the service plug 25 are arrayed along a longer side of the battery pack 10, the air cleaner 16, a filter member in the air cleaner 16, and the 12V terminal set 23 being arrayed parallel thereto.

15 Claims, 6 Drawing Sheets

RIGHT ←→ LEFT

COOLING APPARATUS FOR VEHICLE-MOUNTABLE BATTERY PACKS

CROSS-REFERENCE TO RELATED APPLICATION

This application is based upon and claims the benefit of priority from Japanese Patent Application No. 2012-184244, filed Aug. 23, 2012, the entire content of which is incorporated herein by reference.

BACKGROUND OF THE INVENTION

1. Technical Field

This invention relates to a cooling apparatus for vehicle-mountable battery packs, and particularly, to a cooling apparatus for vehicle-mountable battery packs including an air filter and an electric fan.

2. Relevant Art

There are vehicles such as electric automobiles or hybrid automobiles including an electric motor mounted thereon as a drive source for traction. In those vehicles, electric power is supplied to vehicle-mounted electrical appliances including the electric motor. Hence, there is mounted a battery pack for accommodating battery sets with a capacity affording to supply large power.

At the battery pack, the battery sets are accommodated in a battery case. Since battery sets dissipate heat upon charge and discharge, the battery sets are cooled by passing outside air through the battery case. Outside air is suctioned inside the battery case, using an electric fan, while outside air is cleaned with an air cleaner to prevent foreign matter such as dust from invading the battery case.

To this point, in JP 2006-73256 A, there is disclosed a technique of connecting a pipe-shaped air suction duct to a battery case, having an intervening filter member in mid-way of the air suction duct.

SUMMARY OF THE INVENTION

This technique, using a pipe-shaped air suction duct, has a significant pressure loss at the air suction duct, and is to employ an electric fan with a large air-blowing capacity to obtain a desirable air flow, increasing power consumption at the electric fan, as a problem.

This invention has been devised in view of the foregoing. It is an object of this invention to provide a cooling apparatus for vehicle-mountable battery packs adapted to take in a desirable flow rate of outside air as cooling air even in use of an electric fan operable with small power consumption.

To achieve the object described, according to an aspect of this invention, there is provided a cooling apparatus for vehicle-mountable battery packs adapted to be provided at a battery pack having a battery case accommodating therein a battery set configured to supply electric power to electrical appliances to be mounted on a vehicle, and to have outside air cleaned by an air cleaner and introduced as cooling air to the battery case by an electric fan, the cooling apparatus for vehicle-mountable battery packs comprising a combination of the air cleaner, an air suction port configured to take in cooling air to an inside of the battery case, and an object set being a set of one or more operation objects operable in maintenance services to the battery pack, provided at any one of an upside, a lateral side, and a bottom side of the battery case, and a combination of the air suction port and a subset of the object set, disposed along a longitudinal side of the battery case, in association with a combination of a dirty side chamber and a filter member of the air cleaner formed in shapes elongate in a longitudinal direction of the battery pack, disposed in a juxtaposition to the combination of the air suction port and the subset of the object set.

DESCRIPTION OF EMBODIMENTS

There will be described embodiments of this invention, with reference to the drawings. In the drawings, FIG. 1 to FIGS. 9A and 9B illustrate a cooling apparatus for vehicle-mountable battery packs according to an embodiment of this invention, a vehicle having the apparatus mounted thereon, or part of either thereof. It is noted that the drawings as well as description referring thereto employ a system of three-dimensional directions defined with respect to an illustrated vehicle, omitting redundant phrases such as 'relative to a forward direction of the vehicle'.

Figure 1:
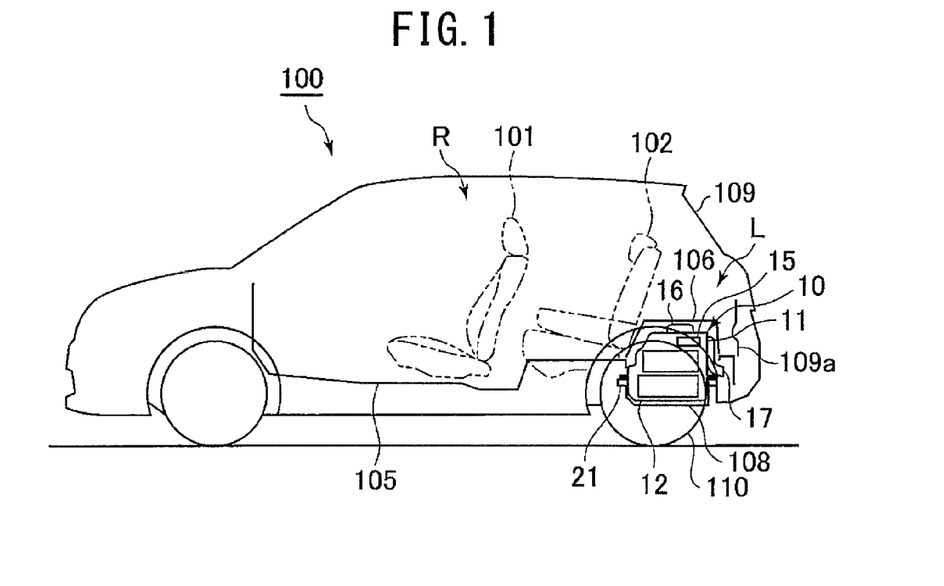
FIG. 1 is a transparent side view of a vehicle having mounted a cooling apparatus for vehicle-mountable battery packs according to an embodiment of this invention.
Figure 2:
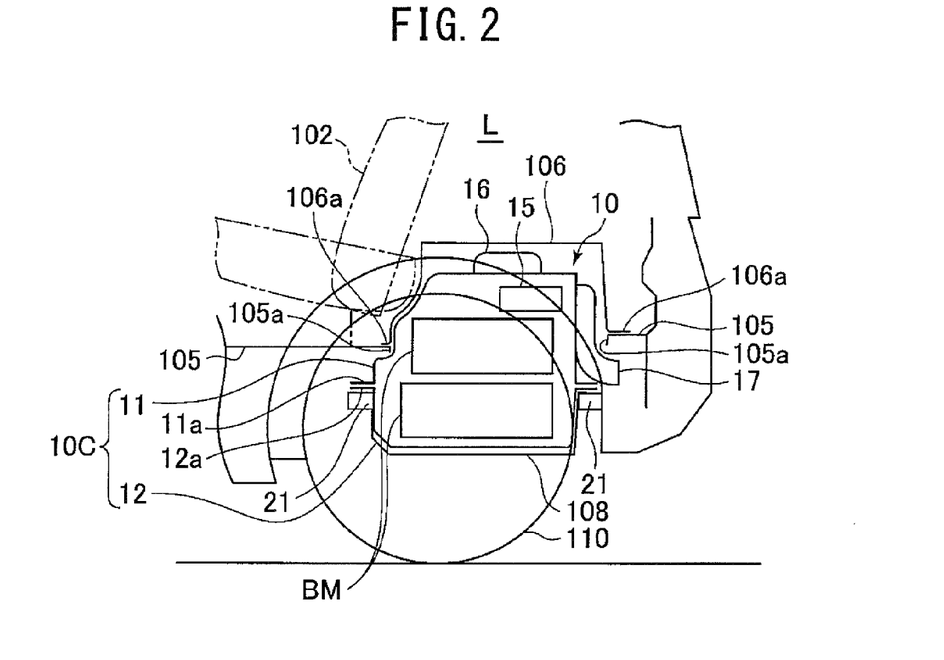
FIG. 2 is a transparent side view of an essential portion including a battery pack of the vehicle in FIG. 1.

FIG. 1 as well as FIG. 2 shows a vehicle 100 including a vehicle interior R above a floor panel 105 that has a front seat 101 and a rear sheet 102 mounted thereon. The vehicle interior R has a rear space thereof constituting a luggage room L that can be used by operating a hatchback door 109 to open and close. This vehicle 100 is made up as a hybrid vehicle being an automobile including a battery pack 10 with a large capacity disposed in the luggage room L.

The hybrid vehicle 100 is adapted for use of the battery pack 10 to supply electric power therefrom to vehicle-mounted electrical appliances including an air conditioner, as necessary, to implement their utilization such as air-conditioning the vehicle interior R, as well as for use of the battery pack 10 to supply electric power therefrom to an electric motor being a drive source co-operable with an internal combustion engine to drive the hybrid vehicle 100, to travel at a desirable speed.

The battery pack 10 includes a battery case 10C vertically separable into two being an upper case 11 and a lower case 12, and a set of subsets of a battery set being arrayed battery modules BM accommodated in the battery case 10C. The upper case 11 and the lower case 12 have their opening edge parts 11a and 12a flanged for a butt-coupling in between to define therein an accommodation space for accommodating the set of battery subsets being an array of battery modules BM.

The battery module BM array is a horizontal parallel array of battery modules BM. This battery module BM array has sub-arrays thereof stacked in vertical two stages for accommodation to the battery pack 10, affording for storage of a great amount of electricity.

Such being the case, the battery pack 10 has an accommodation space defined inside a combination of the upper case 11 and the lower case 12, for adaptation to accommodate a stack of two-staged sub-arrays of battery modules BM, allowing for a successful minimized accommodation space to be secured as a space occupied by the battery pack with a vehicle-longitudinal length at the luggage room L in the vehicle 100.

There is a sub-frame 21 fixed to a vehicle body of the vehicle 100 for supporting the opening edge parts 11a and 12a of the upper and lower cases 11 and 12 as coupled, whereby the battery pack 10 is set in a position for the upper case 11 to protrude in part above a laid level at an upside of the floor panel 105 at the luggage room L in the vehicle 100. The lower case 12 is set in a position for the entirety to reside under the laid level of the floor panel 105.

The battery pack 10 has an upper portion thereof inserted in an upper cover panel 106 formed in a protrusion shape, which is fixed to a region of the floor panel 105 in the luggage room L. The upper cover panel 106 is contoured to cover the upper case 11 to be kept from exposure to the luggage room L.

The battery pack 10 has a lower portion thereof inserted in a lower cover panel 108 that is fixed to a downside of the sub-frame 21 by which the battery pack 10 itself is supported on the vehicle body. The lower cover panel 108 is contoured to cover the lower case 12 to be kept from exposure under the vehicle 100.

The upper cover panel 106 is fixed to the floor panel 105. More specifically, as shown in FIG. 2, the upper cover panel 106 has at the lower end an opening provided with a flanged opening edge part 106a, which is opposed to and joined with a peripheral part of an opening 105a that the floor panel 105 has in the luggage room region. The opening 105a in the floor panel 105 is thus closed. It is noted that the lower cover panel 108 is fixed to the sub-frame 21, as described. More specifically, as shown in FIG. 4, the lower cover panel 108 has at the upper end an opening provided with a flanged opening edge part 108a, which is opposed to and joined with the downside of the sub-frame 21.

Figure 3:
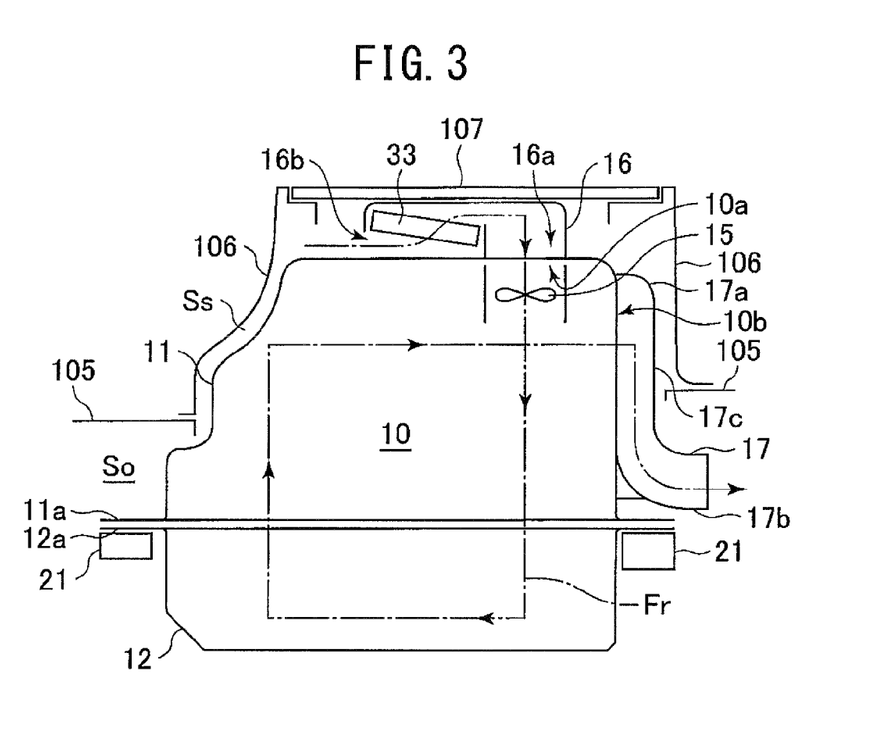
FIG. 3 is a fragmentary enlarged transparent side view of an essential portion of the vehicle illustrating streams of air inside and outside the battery pack.
Figure 4:
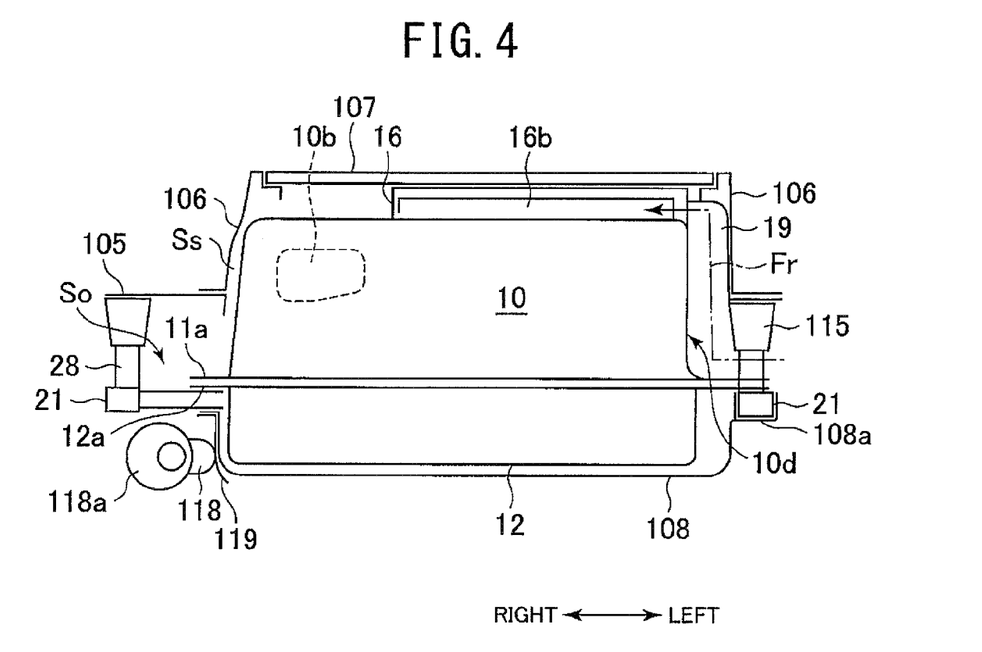
FIG. 4 is a transparent front view of an essential portion of the vehicle showing locations of an air suction port and an air discharge port of the battery pack.

FIG. 3 as well as FIG. 4 shows a space So that is defined between the floor panel 105 and the sub-frame 21, and is open to the outside, and a space Ss that is defined as a clearance between the upper cover panel 106 and the upper case 11. The open space So and the clearance space Ss communicate with each other. Outside air flows from the open space So into the clearance space Ss, as the clearance space Ss has negative pressures developed relative to the open space So.

As shown in FIG. 3, the battery pack 10 has an air cleaner 16 provided at a top side thereof, to clean air being suctioned to the battery pack 10. The air cleaner 16 is disposed above the floor panel 105 in level, and at a range of levels vicinal to a ceiling of the upper cover panel 106 in the side view (inside a service lid 107 in a plan view). This arrangement affords, when the vehicle 100 is running, to minimize amounts of dust and the like rolling up from the road or such, arriving at the air cleaner 16. It thus allows for a minimized invasion of foreign matter to the air cleaner 16, with an extended service life of a filter member 33 shown in FIG. 8.

As shown in FIG. 3 and FIG. 4, at the upper cover panel 106, a top part thereof has the service lid 107 detachably fit therein as a lid member adapted to open and close a substantially entire area at an upside of the top part. As will be seen from FIG. 3 through FIG. 6, the service lid 107 is detachable from the top part of the upper cover panel 106 to open the area of an opening in the upside of the top part, i.e., to expose an inside of the opening to the outside, for adaptation to provide various maintenance services such as those to the battery pack 10 or the air cleaner 16. In other words, there can be accesses given for maintenance services such as those to the battery pack 10 or the air cleaner 16.

Figure 5:
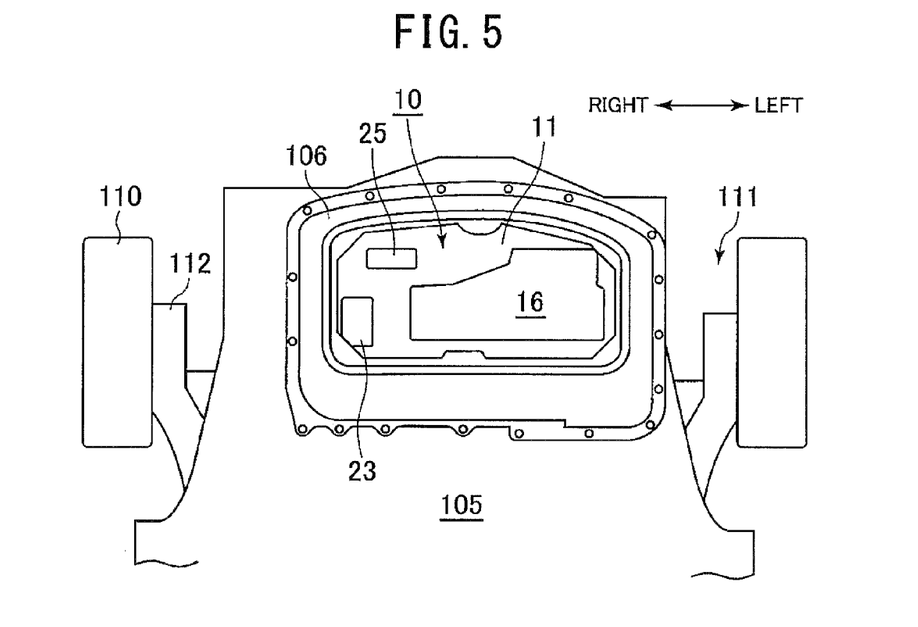
FIG. 5 is a plan view of an essential portion of the vehicle including a cover panel covering the battery pack, excluding a service lid thereof.

As shown in FIG. 5, the vehicle 100 includes a vertically swingable suspension 111 disposed under the floor panel 105, and traveling wheels 110 suspended at both ends of a beam of the suspension 111. As shown in FIG. 4, the vehicle 100 includes a pair of side members 115 vehicle-longitudinally extending at vehicle-transverse two sides, as framework members at the vehicle body end. On the other hand, as shown in FIG. 5, the suspension 111 has a pair of vehicle-longitudinally extending right and left arm portions 112. The arm portions 112 are pivotally supported at front ends thereof on the side members 115. The wheels 110 are rotatably supported at rear ends of the arm portions 112.

Figure 6:
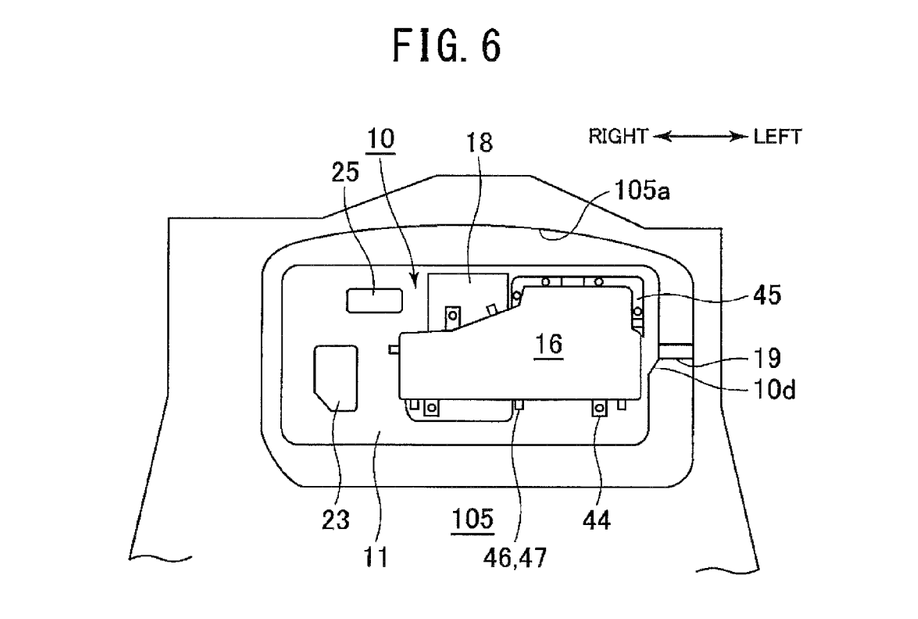
FIG. 6 is a plan view of an essential portion of the vehicle including the battery pack, excluding the cover panel.

As shown in FIG. 4, the vehicle 100 has a vehicle-longitudinally extending exhaust pipe 118 for rearward guiding hot exhaust gases emitted from the internal combustion engine that is installed in a vehicle front section. The exhaust pipe 118 is laid along a route neighboring the battery pack 10 at the right side of the vehicle 100, including a silencer 118a at a location lateral to the battery pack 10. As shown in FIG. 2, the battery pack 10 is provided in the opening 105a of the floor panel 105. Therefore, as shown in FIG. 6, the opening 105a is offset leftward in the luggage room L, to distance the battery pack 10 from the exhaust pipe 118 that liberates heat.

As shown in FIG. 2, under the opening 105a of the floor panel 105, there is arranged the sub-frame 21 in the form of a frame shaped along the periphery of the opening 105a. As shown in FIG. 4, the sub-frame 21 is fixed to the side members 115 as well as cross members joined therewith serving to function as framework members in the vehicle 100. Such being the case, the battery pack 10 is fixed through the sub-frame 21 to framework members including the side members 115.

More specifically, the sub-frame 21 is bolted to a set of framework members including the side members 115, and cross members in between, using, as illustrated in FIG. 4, for instance, sets of interposed brackets 28 serving to function as spacers. On the other hand, as shown in FIG. 2, the opening edge part 106 of the upper cover panel 106 is joined at a downside thereof to an upside of a section of the floor panel 105 (residing in the luggage room L). Then, as shown in FIG. 4, this panel section is supported from below by the set of framework members, which is supporting the sets of brackets 28, and the sub-frame 21. As a result, the panel section is set at a downside thereof to a prescribed level corresponding to the sum of a level of an arbitrary local region at an upside of the sub-frame 21, a height dimension of an associated bracket 28, and a height dimension of an associated frame member. The afore-mentioned open space So is defined between the downside of the panel section, and a combination of lateral sides of the upper case 11, an upside of the opening edge part 11a of the upper case 11, an upside of the opening edge part 12a of the lower case 12 (shown in FIG. 7A), and an upside of the sub-frame 21. This open space So has height dimensions equal to level differences between associated local surface regions of the floor panel 105 and the opening edge part 11a or 12a or the sub-frame 21.

Figure 7A:
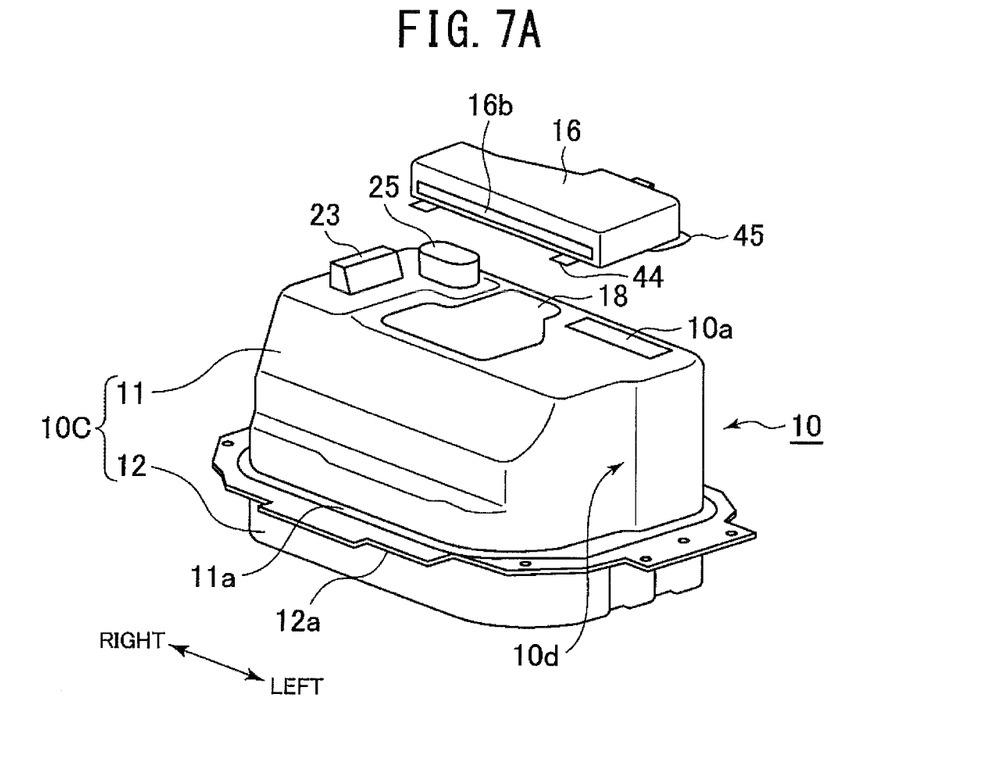
FIG. 7A and FIG. 7B are configuration-illustrating diagrams of an assembly including the battery pack and an air cleaner constituting the cooling apparatus in FIG. 1, FIG. 7A being an exploded perspective view of the assembly, FIG. 7B being a bottom view showing an air outlet of the air cleaner.

As shown in FIG. 3 and FIG. 7A, the battery pack 10 has an air suction port 10a opened in a left region at the top side of the upper case 11, for adaptation to take in air to the inside. As shown in FIG. 3 and FIG. 4, the battery pack 10 has an air discharge port 10b opened in a right region at a rear side of the upper case 11, for adaptation to discharge air to the outside. The battery pack 10 has a cooling fan 15 as an incorporated cooling appliance, whereby it is adapted for suctioning streams of air from outside to the inside through the air suction port 10a, to circulate therein, cooling the battery module BM array, and for forcing out streams of air used for cooling the battery module BM array, to discharge through the air discharge port 10b. This adaptation allows for efficient external diffusion of heat liberated along with charge and discharge at batteries.

As shown in FIG. 3, the cooling apparatus according to this embodiment includes an air cleaner 16 disposed above the air suction port 10a provided at the battery pack 10, and an air channel set Fr as a set of air channels for streams of air to be introduced from outside, cleaned through the air cleaner 16, and suctioned inside the battery pack 10 with negative pressures produced by rotation of the cooling fan 15, to circulate through the inside, to discharge through an air discharge duct 17.

The cooling fan 15 is disposed inside the upper case 11 of the battery pack 10, at a location higher than the upper stage of battery module BM sub-arrays, for suctioning air from outside through the air suction port 10a at an upside of the upper case 11.

Figure 7B:
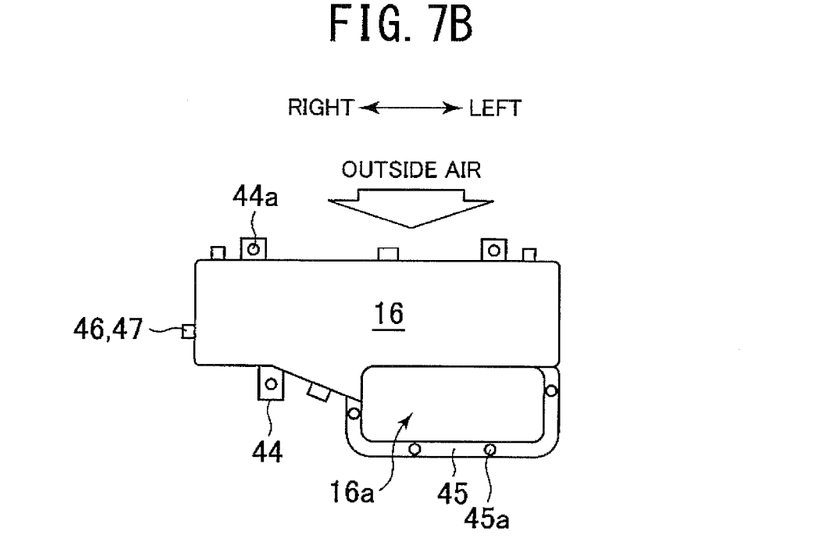

The air cleaner 16 is formed as illustrated in FIG. 3 through FIG. 6, in a box shape with a height smaller than lengths and widths thereof, and fabricated as illustrated in FIG. 1 and FIG. 2, to be compact when installed on the upper case 11, without getting vehicle-vertically bulky. The air cleaner 16 is placed as illustrated in FIG. 3 through FIG. 6, on a region including the air suction port 10a at the upside of the upper case 11, covering the air suction port 10a from above. As shown in FIG. 7B, the air cleaner 16 has an air outlet 16a opened at a downside of a filter case 16C thereof (see FIG. 8). When the air cleaner 16 is placed on the upper case 11, as illustrated in FIG. 3, the air outlet 16a overlaps the air suction port 10a, so that their insides directly communicate with each other. As shown in FIG. 7A, the air cleaner 16 has an air inlet 16b opened at a front side of the filter case 16C (see FIG. 8), for taking in air directly from outside as illustrated in FIG. 3.

As shown in FIG. 3, the air discharge port 10b, opened in a right region at the rear side of the upper case 11, is connected to an opening 17a at an upper end of the air discharge duct 17. The air discharge duct 17 has another opening 17b at a lower end thereof, with a tubular body portion 17c in between. This opening 17b is located in the open space So under the floor panel 105.

For the battery pack 10, the cooling apparatus is made up to take in streams of outside air as cooling air streams at the left side of the vehicle that is opposite to the exhaust pipe 118 shown in FIG. 4, to minimize influences of heat liberated from the exhaust pipe 118. For this reason, as illustrated in FIG. 7A, the upper case 11 of the battery pack 10 is recessed at the left side, over a front surface area thereof, to provide a recess 10d. This left recess 10d is shaped to define an air channel for upward conducting natural ventilation streams (of outside air), thereby guiding those air streams vehicle-rearward flowing in the open space So under the floor panel 105 when the vehicle is running, toward the air cleaner 16.

Moreover, as shown in FIG. 4 and FIG. 6, the cooling apparatus for the battery pack 10 includes an air stream guiding plate 19 arranged outside the left recess 10d, in a vertical posture for upward conducting air streams. The air stream guiding plate 19 has a contour adapted for catching streams of air going to flow by the left outside of the left recess 10d, to guide air streams along a subset of the air channel set Fr illustrated by an arrowed streamline in FIG. 4, whereby air is conducted toward the air inlet 16b of the air cleaner 16.

For such arrangement, the air suction port 10a of the battery pack 10 shown in FIG. 7A is disposed in a left rear region at the upside of the upper case 11 that is spaced at a maximized distance from the exhaust pipe 118 shown in FIG. 4, to take in streams of outside air having passed the air cleaner 16 shown by an outline of the filter case in FIG. 3 (i.e., streams of air having income through the air inlet 16b at a front side of the filter case, and outgoing through the air outlet 16a at a downside of the filter case), as air streams for cooling. The air discharge port 10b of the battery pack 10 shown in FIG. 3 is disposed in a right upper region at the rear side of the upper case 11, as illustrated by broken lines in FIG. 4 (which has a duct upper end portion omitted for simplicity). The air discharge port 10b of the battery pack 10 discharges air, which is released under the floor panel 105, through the air discharge duct 17 that vertically extends as shown in FIG. 3. The air discharge duct 17 has the opening 17b at the lower end, which is thus spaced off at a distance from the air suction port 10a end of the battery pack 10.

As shown in FIG. 3, the battery pack 10 has, as a subset of the air channel set Fr, a series of groups of fluid channels using streams of air induced from outside by the cooling fan 15, for cooling the battery module BM sub-arrays stacked in two stages being upper and lower stages. The series of channel groups is composed of a group of inlet end channels, a group of cooling channels, and a group of outlet end channels that constitute three sections of a network of connected channels in the battery pack 10, respectively. The inlet end channel group includes air channels downward extending from the air suction port 10a for adaptation to send cooling air streams into spaces behind battery modules BM. The cooling channel group includes air channels arranged to make cooling air streams flow forward, passing by battery modules BM from behind, cooling the battery modules BM. The outlet end channel group includes a combination of air channels upward extending from spaces in front of battery modules BM, and air channels connected thereto to additionally extend vehicle-rearward, adapted for co-operation in between to conduct air streams used for cooling battery modules BM, toward the air discharge port 10b. It is noted that as shown in FIG. 4 the lower cover panel 108, covering the lower case 12 of the battery pack 10 from outside, has areas thereof neighboring the exhaust pipe 118, which are thermally protected by provision of an intervening heat-shielding plate 119.

As shown in FIG. 7A, for the battery pack 10, the cooling apparatus includes the air suction port 10a opening in a left rear region at the upside of the upper case 11, and the air cleaner 16 that has a rear bulge portion thereof disposed in a position to cover the air suction port 10a from above. As shown in FIG. 7B, the air outlet 16a of the air cleaner 16 is open at a downside of the rear bulge portion. As shown in FIG. 7A, the air cleaner 16 has a front body portion provided with the air inlet 16b. In this regard, as illustrated in FIG. 9B, the air cleaner 16 is implemented with a casing structure for conducting outside air. There are streams of outside air incoming through the air inlet 16b, passing the filter member 33, to go out through the air outlet 16a, along a subset of the air channel set Fr. The filter member 33 serves also as a partition member, planer in contour, for separating an internal space of the air cleaner 16, into a dirty side chamber 31a defined with a downside 33b of the filter member 33, and a clean side chamber 31b defined with an upside 33b of the filter member 33. As will be seen from FIG. 7A, FIG. 8, and FIG. 9B, the filter member 33 as well as the dirty side chamber 31a is arranged in front of the air suction port 10a of the battery pack 10 in a plan view. The filter member 33 as well as the dirty side chamber 31a is made in a rectangular form with a front side as a longer side in a plan view, and arranged to be transversely elongate in FIG. 7A, like the upper case 11 of the battery pack 10 that is vehicle-transversely elongate. As will be seen from FIG. 8 and FIG. 9B, in a plan view, the clean side chamber 31b has an area extending over both the front body portion and the rear bulge portion of the air cleaner 16.

As shown in FIG. 5, FIG. 6, and FIG. 7A, at the upside of the upper case 11, there is a combination of a 12-volt terminal set 23 and a service plug 25 disposed as operable appliances, i.e., operation objects, in front and rear regions on a right area thereof, neighboring the air cleaner 16. The air cleaner 16 is fixed to the upside of the upper case 11, by screwing bolts inserted thereto through bolt holes 44a at lugs 44 that project forward or rearward from the front body portion of the air cleaner 16, as illustrated in FIG. 6, FIG. 7A, FIG. 7B, or FIG. 8. As shown in FIG. 6 and FIG. 7A, under the air cleaner 16 there is disposed a fuse box 18 for fuses to be applied.

The vehicle 100, having mounted the cooling apparatus for the battery pack 10, affords to swing up the hatchback door 109, opening the luggage room L, and remove the service lid 107 from the top part of the upper cover panel 106, thereby permitting various maintenance services to be provided. There may be an operator getting access from behind the vehicle 100 to a set of one or more operation objects such as the 12-volt terminal set 23, the service plug 25, and/or the air cleaner 16, for facilitated maintenance services to any subset of such the object set. For the fuse box 18, the air cleaner 16 can be removed together with a box cover, for facilitated services such as those to fuses to be checked or replaced.

Figure 8:
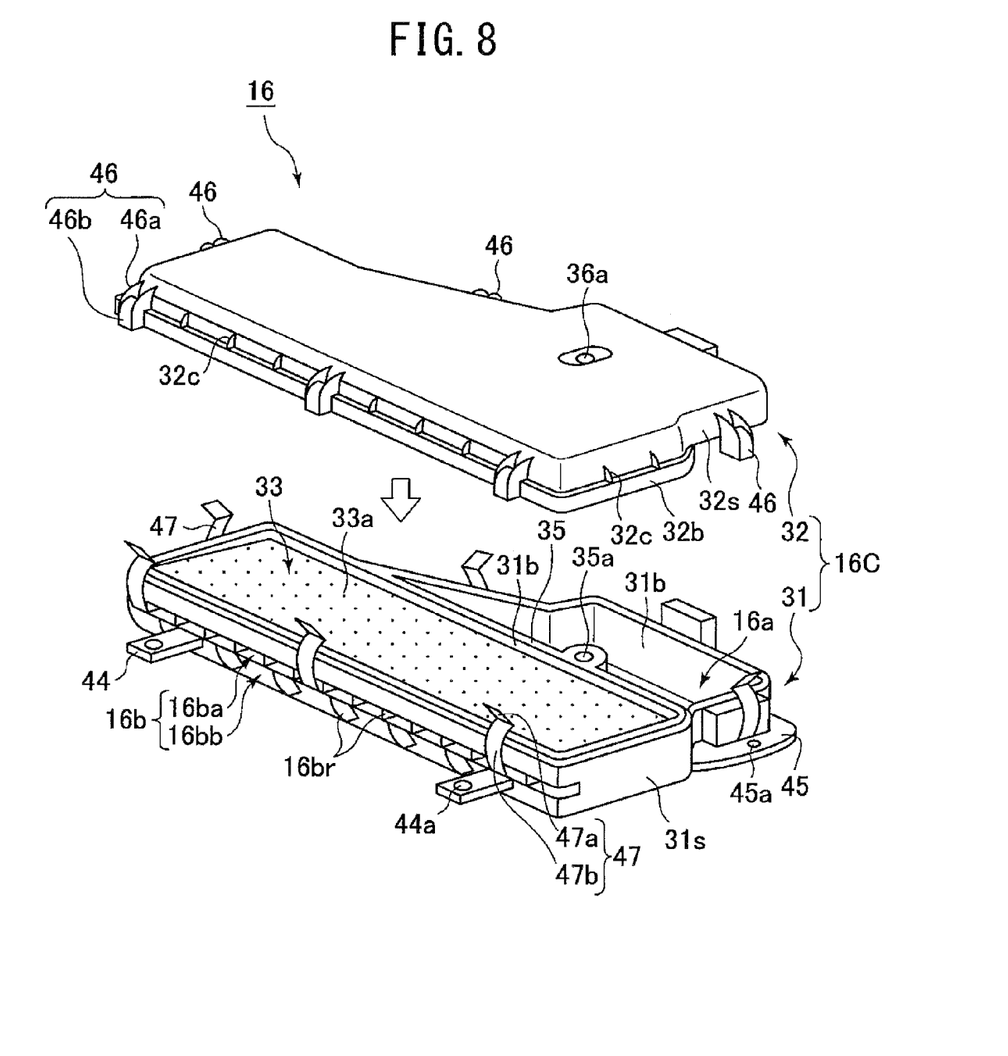
FIG. 8 is an exploded perspective view of the air cleaner.
Figure 9A:
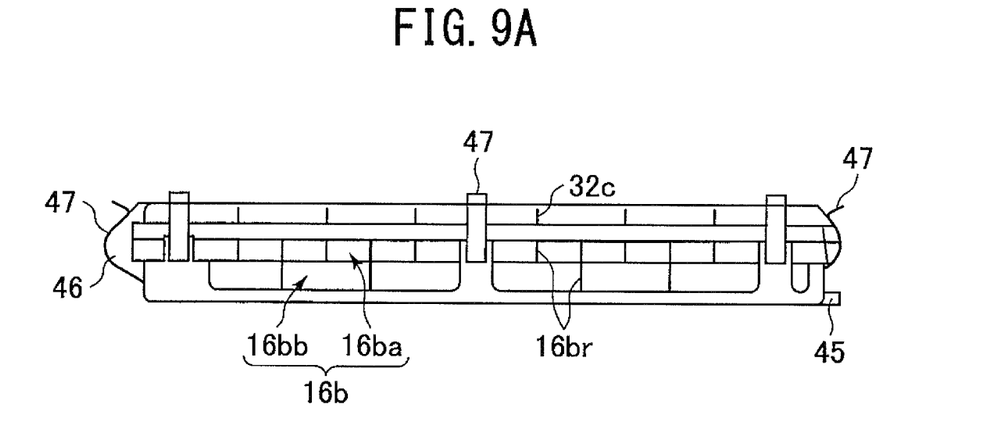
FIG. 9A and FIG. 9B are diagrams for describing operations of the air cleaner, FIG. 9A being a front view of the air cleaner showing an air inlet, FIG. 9B being a longitudinal sectional side view of the air cleaner showing streams of air.
Figure 9B:
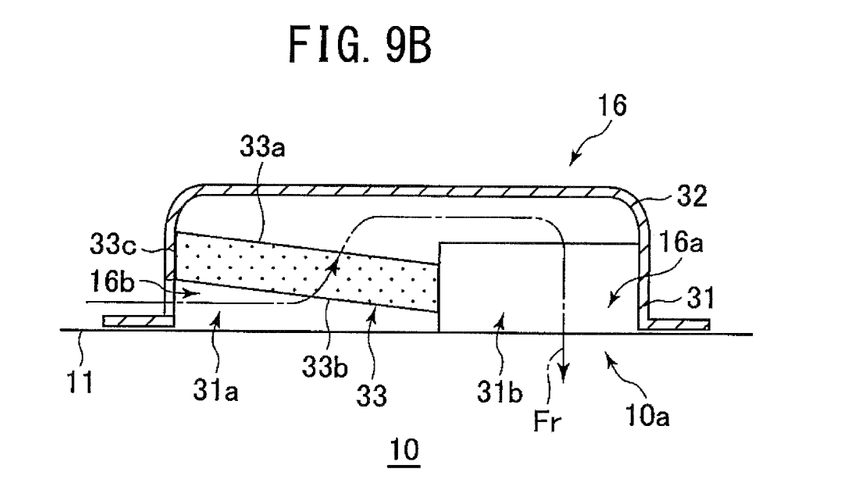

As will be seen from FIG. 5, FIG. 8, and FIG. 9B, for the battery pack 10, the cooling apparatus has the longer sides of the filter member 33 and the dirty side chamber 31a communicating with the air inlet 16b of the air cleaner 16, arranged in parallel to the vehicle-transverse direction, like a longer side at the upside of the upper case 11. This cooling apparatus has a combination of the air suction port 10a and the service plug 25 arranged in juxtaposition as shown in FIG. 7A, on a rear area at the upside of the upper case 11. Such the arrangement affords for the filter member 33 to intervene in a subset of the air channel set, Fr, with an increased filtration area having a reduced fluid resistance in the air channel subset. Moreover, the air cleaner 16 is implemented in a structure including the air inlet 16b opening at the front side over a vehicle-transverse length of the air cleaner 16, to take in outside air to the dirty side chamber 31a in a ductless manner.

Accordingly, the air cleaner 16 has an air conducting structure including the filter member 33 with a reduced fluid resistance, in combination with the air inlet 16b excluding a conventional ducting that otherwise might constitute a fluid resistance in an air channel set, permitting a significant flow rate of outside air to be taken in (or induced) as a flux of cooling air to the inside of the air cleaner 16, with a relatively small fluid resistance even in the sum. It is noted that the air cleaner 16 may have a fluid resistance reduced to about one tenth of that of a typical air cleaner employed for internal combustion engines.

As a result, the cooling fan 15 selected to install may have a small blowing capacity consuming small power. This permits battery modules BM in the battery pack 10 to have levels of stored electric energy kept free from significant consumption due to operation of the cooling fan 15.

As shown in FIG. 8 and FIG. 9A, the air cleaner 16 is made up as a combination of a filter case 16C being a cleaner shell member shaped in the form of a vessel vertically down-sized and rendered width-wise planer to enable installation in a narrow space, and the filter member 33 shaped planer for accommodation to the filter case 16C. The filter case 16C, separable in the thickness direction into two as shown in FIG. 8, is composed of a lower case 31 and an upper case 32 to be joined to each other, with the filter member 33 interposed in between. As shown in FIG. 9B, the filter case 16C has the dirty side chamber 31a defined under the filter member 33 for streams of incoming outside air to be cleaned at the filter member 33, and the clean side chamber 31b defined above the filter member 33 for streams of air cleaned through the filter member 33 to strike into that.

As will be seen from FIG. 8 and FIG. 9B, the lower case 31 has a boundary wall 35 as a partition between the dirty side chamber 31a that has air communication with the outside through the air inlet 16b of the air cleaner 16, and part of the clean side chamber 31b that constitutes an air channel involving the air outlet 16a of the air cleaner 16, which is to face the air suction port 10a of the battery pack 10 for air communication in between.

As shown in FIG. 8 and FIG. 9A, the air inlet 16b of the lower case 31 has a grill window structure with a wide front positively making use of a dimension at the longer side of the lower case 31. More specifically, there is used a vertically halved grill pattern including an upper grill 16ba and a lower grill 16bb that have a front size nearly equal to a dimension of the longer side of the filter member 33. The upper grill 16ba and the lower grill 16bb have their upper edge parts and lower edge parts interconnected with each other, respectively, by support ribs 16br interposed in between to provide the lower case 31 with an increased rigidity. The upper grill 16ba and the lower grill 16bb constitute an upper inlet and a lower inlet of the air inlet 16b, respectively, while the upper inlet may be blocked.

As shown in FIG. 9B, the filter member 33 is arranged over a ceiling area of the dirty side chamber 31a, with a filtration plane thereof somewhat rearward tilted relative to a horizontal position, for adaptation to clean streams of air striking therethrough from the downside 33b end to the upside 33a end.

As shown in FIG. 6, FIG. 7A, FIG. 7B, FIG. 8, or FIG. 9A, the lower case 31 has, besides the outwardly projecting lugs 44 to be screwed, a flanged part 45 outwardly projecting from a periphery of the air outlet 16a. The flanged part 45 is to be fixed by screwing bolts inserted through bolt holes 45a, whereby a circumferential periphery of the air outlet 16a is attached, to fix, on a peripheral region of the air suction port 10a at the upside of the upper case 11, with a sealant in between to be airtight under pressure.

The air cleaner 16 has the air inlet 16b, which is wide open allowing for a reduced fluid resistance even with provision of the intervening filter member 33. As shown in FIG. 8, the filter member 33 has a filtration plane shaped in a rectangular form with vehicle-transversely extending shorter sides and vehicle-longitudinally extending longer sides. As will be seen from FIG. 5, FIG. 6, and FIG. 7A, at the filter member 33, the longer sides of the filtration plane have a length substantially equal to a vehicle-transverse dimension at the upside of the upper case 11 of the battery pack 10 minus a vehicle-transverse dimension of a narrow space secured for installation of and maintenance to the 12-V terminal set 23. The air cleaner 16 is thus adapted to conduct a sufficient flow rate of outside air (as a flux of cooling air) with a small fluid resistance. Therefore, even with provision of the intervening filter member 33, the air cleaner 16 is co-operable with the cooling fan 15 consuming small electric power, to conduct a significant flux of cooling air to the battery pack 10. Moreover, the filter member 33 has a large area of filtration plane that is advantageous for the service life to be extended.

As shown in FIG. 8, the air outlet 16a of the air cleaner 16 has an aperture opening with a large area at a bottom region that the clean side chamber 31b has in the rear bulge portion of the air cleaner 16. At the air outlet 16a, where clean air having passed the filter member 33 goes out, the aperture has a minor fluid resistance inversely proportional to the area, which is insignificant.

As shown in FIG. 9B, the clean side chamber 31b has an upper region thereof defined by the upper case 32. As will be seen from FIG. 8, the upper case 32 has a side wall 32s provided over an entire circumference thereof, which is made up to fit on a side wall 31s provided over an entire circumference of the lower case 31, with an intervening sealing member applied to block clearances in between under pressure to hold the interior airtight. The side wall 32s is similar to the side wall 31s, and greater by one size than the side wall 31s.

As will be seen from FIG. 8 and FIG. 9B, the air cleaner 16 has streams of outside air passing the filter member 33, getting cleaned, striking into the clean side chamber 31b, where they turn to flow beyond the boundary wall 35, into an air channel being a spatial region in the lower case 31 partitioned from the dirty side chamber 31a by the boundary wall 35. Then, at a downstream end of the air channel, air streams go out through air outlet 16a, flowing into the air suction port 10a of the battery pack 10. It is noted that as shown in FIG. 8 and FIG. 9A, at the upper case 32, the side wall 32s is formed with a widened lower end part 32b, of which an upside is connected at locations thereon to the outside of the side wall 32s, using ribs 32c to provide an enhanced rigidity.

As will be seen from FIG. 6, FIG. 7B, FIG. 8, and FIG. 9A, at the air cleaner 16, the upper case 32 has projections 46 integrally formed on the outside of the side wall 32s being an upper side wall, and the lower case 31 has spring hooks 47 provided on an outside of the side wall 31s being a lower side wall, for adaptation to apply the spring hooks 47 on the projections 46, to thereby hold the filter case 16C in a shut state with the interior sealed airtight (that is, a state of the filter case 16C in which the upper case 32 and the lower case 31 have clearances in between closed and blocked up to be airtight with the sealing member under pressure). The projections 46 are each composed of a pair of rib-shaped parts 46a, and a curved part 46b formed between the rib-shaped parts 46a and recessed relative to the rib-shaped parts 46a. The spring hooks 47 each have a proximal end part 47b curved in accord with the curved part 46b at an associated projection 46, and a distal end part 47a shaped in the form an outwardly flexible guide.

Therefore, the spring hooks 47 are each adapted at an associated projection 46 to have the distal end part 47a inserted and positioned between the rib-shaped parts 46a, while having the proximal end part 47b guided and flexed by the curved part 46b, before an elastic return to enter a hooking state, affording to keep a sealed shut state between the upper case 32 and the lower case 31 of the filter case 16C.

Moreover, as will be seen from FIG. 8, at the air cleaner 16, the lower case 31 has a female threaded hole 35a formed in the boundary wall 35, and the upper case 32 has a through hole 36a opened therethrough at a corresponding location, for adaptation to have a bolt provided through the through hole 36a and inserted and screwed to the female threaded hole 35a, affording to keep a sealed shut state of the filter case 16C in the more ensured manner. It is noted that a periphery at the lower end of the through hole 36a can be closely attached to a periphery of the female threaded hole 35a at the upside of the boundary wall 35, allowing for an ensured airtightness.

Further, as shown in FIG. 9B, in the dirty side chamber 31a at the lower case 31 of the air cleaner 16, the filter member 33 as set up has the downside 33b facing the air inlet 16b in an oblique tilt position.

By doing so, the cleaner 16 is adapted to have a flux of cooling air taken in from the air inlet 16b, conducted to the downside 33b of the filter member 33, as it goes, flowing from the downside toward the upside 33a, affording to conduct a flux of cooling air toward the air outlet 16a in a fluid channel minimized in flex, with a small fluid resistance.

Such being the case, according to embodiments herein, the cooling apparatus for the battery pack 10 is adapted to have a reduced fluid resistance when installed at the battery pack 10. Moreover, the cooling apparatus including the cooling fan 15 is adapted to have a significant flux of cooling air cleaned through the air cleaner 16 being driven with small power consumption, without wasting electric energy stored in the battery pack 10, to take in to the inside of the battery pack 10 through a minimized fluid resistance. Accordingly, battery modules in the battery pack 10 can be efficiently cooled in an effective manner.

Embodiments described herein are addressed to an example of arrangement including an air cleaner 16 installed at an upside of a battery pack 10, while they are not limited thereto. For instance, there may be embodiments including an air cleaner installed at a specific side such as a lateral side or a bottom side of a battery pack, and an air suction port disposed at the same side in combination with appliances such as a service plug.

Embodiments described herein are addressed to a an example of hybrid vehicle, while they are not limited thereto, but cover similar configurations applicable to electric vehicles using drive forces of an electric motor to travel.

As is apparent from the foregoing description, according to a first aspect of embodiments described herein, there is disclosed a cooling apparatus for vehicle-mountable battery packs adapted to be provided at a battery pack 10 having a battery case 10C accommodating therein a battery set BM configured to supply electric power to electrical appliances to be mounted on a vehicle 100, and to have outside air cleaned by an air cleaner 16 and introduced as cooling air to the battery case 10C by an electric fan 15, the cooling apparatus for vehicle-mountable battery packs comprising a combination of the air cleaner 16, an air suction port 10a configured to take in cooling air to an inside of the battery case 10C, and an object set being a set of one or more operation objects 16, 18, 23, and 25 operable in maintenance services to the battery pack 10, provided at any one of an upside, a lateral side, and a bottom side of the battery case 10C, and a combination of the air suction port 10a and a subset of the object set, disposed along a longitudinal side of the battery case 10C, in association with a combination of a dirty side chamber 31a and a filter member 33 of the air cleaner 16 formed in shapes elongate in a longitudinal direction of the battery pack 10, disposed in a juxtaposition to the combination of the air suction port 10a and the subset of the object set.

According to a second aspect of embodiments herein, there is disclosed a cooling apparatus for vehicle-mountable battery packs, wherein the air cleaner 16 comprises an air inlet 16b configured to directly take in outside air inside the dirty side chamber 31a, the air inlet 16b having an elongate shape elongate in an identical direction to a longitudinal direction of the filter member 33.

According to a third aspect of embodiments herein, there is disclosed a cooling apparatus for vehicle-mountable battery packs, wherein the air cleaner 16 has the air inlet 16b formed with an equivalent length to a longitudinal dimension of the filter member 33.

According to a fourth aspect of embodiments herein, there is disclosed a cooling apparatus for vehicle-mountable battery packs, wherein the air cleaner 16 has the filter member 33 fixed to obliquely oppose the air inlet 16b.

According to a fifth aspect of embodiments herein, there is disclosed a cooling apparatus for vehicle-mountable battery packs, wherein the battery pack 10 is adapted to dispose behind a rear seat 102 of the vehicle 100, to accommodate in a cover panel 106 and 108 configured to define a space protruding above a level of a floor panel 105, the cover panel 106 and 108 comprising an upside opening to open an interior space for services to the battery pack 10 accommodated therein, and a lid member 107 to close the upside opening, the air cleaner 16 being disposed at the upside of the battery case 10C opposing the lid member 107.

The cooling apparatus for vehicle-mountable battery packs according to the first aspect of embodiments herein includes a combination of the air suction port 10a and an operation object subset arranged along a side in a longitudinal direction of the battery case 10C, in association with a combination of the dirty side chamber 31a and the filter member 33 in the air cleaner 16 contoured to be elongate in a longitudinal direction of the battery pack 10 to arrange in a juxtaposition with or parallel arrangement to the combination of the air suction port 10a and the operation object subset, thereby permitting the filter member 33 to have a large filtration area secured for outside air to pass, without influences from the combination of the air suction port 10a and the operation object subset. Therefore, this cooling apparatus can take in outside air with a small fluid resistance to let through, for filtration at, the filter member 33 that has a large area. As a result, the electric fan 15 is enabled with small power consumption to have cooling air suctioned for use to cool a battery set BM in the battery pack 10. Moreover, there is secured a large filtration area, allowing for an extended service life of the filter member 33, as well.

The cooling apparatus for vehicle-mountable battery packs according to the second aspect of embodiments herein permits the air inlet 16b to be opened with a wide dimension in the longitudinal direction of the air cleaner 16, to have outside air inflow, affording to take in outside air with a small fluid resistance, without intervening pipes or such. Therefore, it can take in cooling air for cooling the battery pack 10, with small power consumption.

The cooling apparatus for vehicle-mountable battery packs according to the third aspect of embodiments herein has the air inlet 16b formed with an equivalent length to a longitudinal dimensions of the filter member 33, permitting outside air taken in through the air inlet to strike through the filter member 33 with a small fluid resistance. Therefore, it can take in cooling air for cooling the battery pack 10 with small power consumption.

The cooling apparatus for vehicle-mountable battery packs according to the fourth aspect of embodiments herein permits outside air taken in through the air inlet 16b to an incoming space to flow toward a large area at one side of the filter member 33 in a tilted attitude, to strike through it to the other side, affording to render the air channel flexed small, with a minimized fluid resistance. Therefore, it can take in cooling air for cooling the battery pack 10 with small power consumption.

The cooling apparatus for vehicle-mountable battery packs according to the fifth aspect of embodiments herein is installed inside a combination of cover panels 106 and 108 that protrudes into a vehicle interior R, exceeding a level at a rear vehicle section of the floor panel 105, and disposed on the upside of the battery pack 10, opposing the lid member 107. Therefore, it can suppress the amount of dust invading the filter member 33, allowing for an extended service life of the filter member 33.

The scope of this invention is not limited to illustrative embodiments presented in the drawings or described herein, and include any and all embodiments that bring equivalent effects to what is covered by the object of this invention. Further, the scope of this invention is not limited to combinations of features of this invention defined by the appended claims, but defined by any and all desirable combinations of specific features among all features disclosed.

There have been described embodiments of this invention, while this invention is not restricted to the embodiments described, and may be embodied in various modes within the scope of the technical concept.

REFERENCE SIGNS LIST 10 battery pack
10a air suction port
10b air discharge port
15 cooling fan
16 air cleaner
16a air outlet
16b air inlet
17 air discharge duct
23 12V terminal set
25 service plug
31 lower case
32 upper case
33 filter member
33a upside
33b downside
44 lug
45 flanged portion
46 projection
47 spring hook
100 vehicle
102 rear seat
105 floor panel
106 upper cover panel
107 service lid
108 lower cover panel
109 hatchback door
BM battery module
Fr air channel set
L luggage room

What is claimed is:

1. A battery pack having a cooling apparatus comprising:
a battery pack including a battery case accommodating therein a battery set, the battery case having an upper case formed with an air suction port;
a service plug on the upper case;
an electric fan disposed inside the battery case and arranged for introducing air into the battery case through the air suction port; and
an air cleaner including a filter member, an air inlet, and an air outlet, the air outlet being open at a lower side of the air cleaner, the air cleaner being placed on the upper case with the air outlet directly communicating with the air suction port, the filter member having a filtration plane having a rectangular shape defined by shorter sides and longer sides, wherein said longer sides extend in a longitudinal direction, the longer sides of the filter member being disposed on one side of the air suction port, the service plug being separated from the air suction port by a spacing with said spacing extending in a direction parallel to said longitudinal direction;

the battery pack further comprising:

an upper cover panel extending over the battery pack and having a top opening to access for maintenance service of the battery pack; and a lid member closing the top opening, wherein at least a portion of the air cleaner is positioned under the lid member.

2. A battery pack having a cooling apparatus comprising:

a battery pack including a battery case accommodating therein a battery set, the battery case having an upper case formed with an air suction port;

a service plug on the upper case;

an electric fan disposed inside the battery case and arranged for introducing air into the battery case through the air suction port; and an air cleaner including a filter member, an air inlet, and an air outlet, the air outlet being open at a lower side of the air cleaner, the air cleaner being placed on the upper case with the air outlet directly communicating with the air suction port, the filter member having a filtration plane having a rectangular shape defined by shorter sides and longer sides, wherein said longer sides extend in a longitudinal direction, the longer sides of the filter member being disposed on one side of the air suction port, the service plug being separated from the air suction port by a spacing with said spacing extending in a direction parallel to said longitudinal direction; wherein:

a dirty side chamber is defined within the filter case between the upper case of the battery pack and the filter member;

a clean side chamber is defined within the filter case and is separated from the dirty side chamber by the filter member; and a transverse direction extends from the air inlet of the air cleaner to the air suction port and said transverse direction extends transverse to said longitudinal direction, and wherein said filter member is positioned between said air inlet of said air cleaner and said suction port of said upper case along said transverse direction.

3. The cooling apparatus according to claim 2, wherein the filter member obliquely opposes the air inlet.

4. A battery pack having a cooling unit according to claim 3, wherein a longitudinal side of said filter member which is closest to said suction port is vertically lower than a longitudinal side of said filter member which is closest to said air inlet.

5. A battery pack having a cooling apparatus comprising:

a battery pack including a battery case, the battery case having an upper case formed with an air suction port;

an electric fan disposed inside the battery case and associated with the air suction port; and an air cleaner including a filter case fixed to the upper case at a position such that the filter case extends over the air suction port, the air cleaner including a filter member elongated along the upper case, a dirty side chamber defined within the filter case between the upper case of the battery pack and the filter member, the dirty side chamber being elongated along the upper case, an air inlet for the dirty side chamber, a clean side chamber defined within the filter case and separated by the filter member from the dirty side chamber, and an air outlet for the clean side chamber, the air outlet directly communicating with the air suction port, wherein the air outlet is juxtaposed with the dirty side chamber.

6. The battery pack having a cooling apparatus according to claim 5, wherein the air inlet for the dirty side chamber is elongated along the upper case.

7. The battery pack having a cooling apparatus according to claim 6, wherein the filter member obliquely opposes the air inlet such that with respect to a perpendicular direction extending perpendicular to a plane of an opening of the air inlet, the filter member extends at an oblique angle to said perpendicular direction.

8. The battery pack having a cooling apparatus according to claim 5, further comprising:

a service plug on the upper case, the service plug being separated from the air suction port.

9. The battery pack having a cooling apparatus according to claim 8, wherein the filter member is disposed on one side of the air suction port, and the service plug is separated from the air suction port by a spacing which extends parallel to a longitudinal direction of the filter member.

10. The battery pack having a cooling apparatus according to claim 5, further comprising:

an upper cover panel extending over the battery pack to cover the upper case, the upper cover panel cooperating with the upper case to allow outside air to be conducted toward the air inlet for the dirty side chamber of the air cleaner.

11. The battery pack having a cooling apparatus according to claim 10, wherein an inside of the upper case is recessed to define an air channel for upward conduction of air.

12. The battery pack having a cooling apparatus according to claim 11, further comprising:

an air stream guiding plate arranged outside the recess.

13. A battery pack having a cooling apparatus according to claim 5, wherein said filter member is elongated in a longitudinal direction such that the filter member has a dimension in the longitudinal direction which is larger than a dimension of the filter member perpendicular to said longitudinal dimension; and a transverse direction extends from the air inlet of the air cleaner to the air suction port and said transverse extends transverse to said longitudinal direction, and wherein said filter member is positioned between said air inlet of said air cleaner and said suction port of said upper case along said transverse direction.

14. A battery pack having a cooling apparatus according to claim 13, wherein said filter case has a first longitudinal dimension on a first side at which the air inlet extends into the filter case, and wherein the filter case further includes a second longitudinal dimension at a portion which extends over the air suction port, and wherein said second longitudinal dimension is smaller than said first longitudinal dimension.

15. A battery pack having a cooling apparatus according to claim 14, further including a service plug provided on the upper case of the battery pack, wherein said service plug is separated from said air suction port by a spacing extending parallel to the longitudinal direction of the filter member and said service plug is also spaced from said portion of said filter casing which extends over the suction port along a direction parallel to said longitudinal direction, and further wherein said longitudinal direction is parallel to a plane having the air inlet of the filter case therein.

* * * * *